H. E. HAYWARD.
CHAIN LINK.
APPLICATION FILED FEB. 23, 1909.
1,126,461.
Patented Jan. 26, 1915.
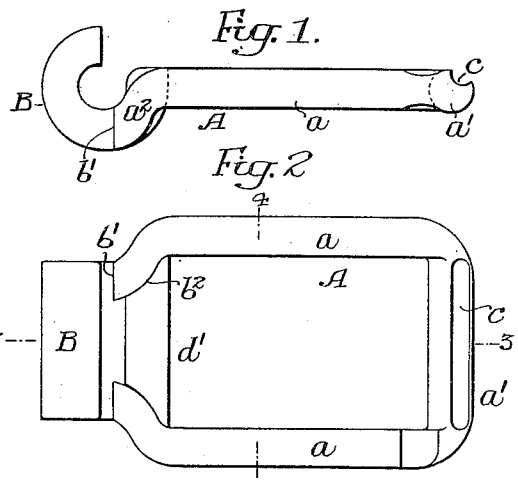
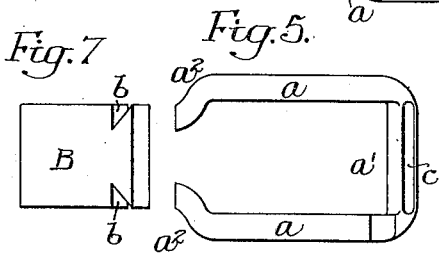
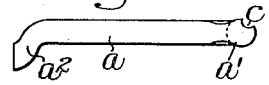
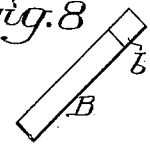
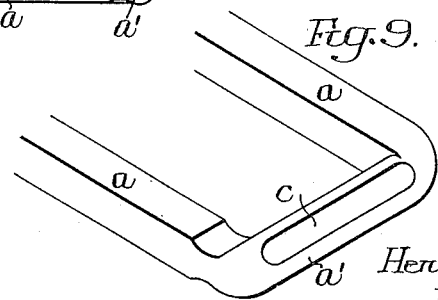
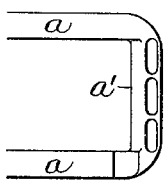
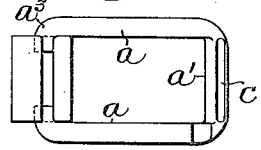
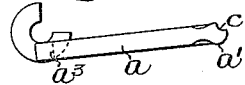
Witnesses—
William H. Rivoir.
Wills A. Burrowes
Inventor
Henry E. Hayward.
by his Attorneys
Howson & Howson

UNITED STATES PATENT OFFICE.

HENRY E. HAYWARD, OF PHILADELPHIA, PENNSYLVANIA, ASSIGNOR TO LINK-BELT COMPANY, OF CHICAGO, ILLINOIS, A CORPORATION OF ILLINOIS.

CHAIN-LINK.

1,126,461.      Specification of Letters Patent.      Patented Jan. 26, 1915.

Application filed February 23, 1909. Serial No. 479,471.

*To all whom it may concern:*

Be it known that I, HENRY E. HAYWARD, a citizen of the United States, residing in Philadelphia, Pennsylvania, have invented certain Improvements in Chain-Links, of which the following is a specification.

My invention relates to certain improvements in detachable chain links, in which one link has a socket adapted to receive the cross bar of an adjoining link. The link, in the present instance, has a quadrangular open center for the reception of the teeth of a sprocket wheel.

The object of my invention is to form a link of this type of a bent hook section to which is attached the body section formed by bending a rod into shape; the parts being secured together by welding in such a manner as to remove the shearing strain from the welded portion.

In the accompanying drawings: Figure 1 is a side view of my improved chain link; Fig. 2, is a plan view; Fig. 3, is a section on the line 3—3, Fig. 2; Fig. 4, is a section on the line 4—4, Fig. 2; Fig. 5, is a detached plan view of the body portion of the link; Fig. 6, is a side view of Fig. 5; Fig. 7, is a detached plan view of the blank from which the hooked member is formed; Fig. 8, is a side view of Fig. 7; Fig. 9, is a perspective view showing the grooved cross bar; Figs. 10 and 11, are sectional views of the cross bar before and after enlarging; and Figs. 12, 13 and 14, are views of modifications.

A is the body portion of the link having side bars $a$, $a$ and a cross bar $a'$. The side bars are preferably quadrangular in cross section, as illustrated in Fig. 4, but they may be made in any shape desired. The cross bar $a'$ of the link is round, being reduced, in the present instance, from the square. The free ends $a^2$ of the side members are bent and shaped so as to fit in the recesses $b$, $b$ formed in each side of the blank B, Figs. 5 and 7, from which the hook is made. It will be noticed that the ends $a^2$ are bent in toward each other at an angle and then bent slightly forward so as to fit neatly in the recesses $b$ of the blank. The two parts are welded along the edges $b'$, $b^2$ of the blank and by making the blank with the under-cut recesses as shown, the weld is relieved of considerable strain, as one part interlocks with the other. After the parts are welded the blank B is bent into shape to form the hooked member $d$, as shown in Fig. 1, although in some instances the hooked member may be bent into shape before the parts are welded, depending considerably upon the size of the link. The rear portion of the blank forms the bearing surface $d'$ for the teeth of the sprocket wheel; giving a broad bearing surface the full width of the chain, as shown in Fig. 2.

In Figs. 12 and 13, I have shown a modification in which the ends of the body portion of the link are bent at right angles, as at $a^3$, and these ends are adapted to notches $b'$ in the blank B' of the hook member and are welded by the electric or other process.

My improved link must be so made that its hook member is adapted to fit the cross bar of an ordinary malleable link. In many instances these cross bars are far from round so that the inner surface of the hook member must be of such a radius as to fit the greatest diameter of such elongated bar.

In practice the inner diameter of the hook member is greater than the diameter of the bar at the opposite end of the link, but, as it is of advantage to have as large a bearing surface as possible, I increase the diameter of the bar $a'$ by indenting it at $c$ on that side opposite to the wearing surface, and this indentation will increase the diameter to such an extent that the bar will conform more closely to the enlarged opening in the hook member. The indentation may extend the full width of the link, as in Fig. 9, or may be divided into sections by ribs $c'$, Fig. 14, if desired.

I claim:—

An open rectangular chain link comprising two sections, one of said sections being U-shaped and the other in the form of a hook; the extreme ends of the U-shaped section extending toward each other at an angle and the hook section normally having an angular recess at each side below the opening of the hook adapted to receive and interlock with the said ends of the U-shaped section.

In testimony whereof, I have signed my name to this specification, in the presence of two subscribing witnesses.

HENRY E. HAYWARD.

Witnesses:
Jos. H. KLEIN,
WM. A. BARR.

Copies of this patent may be obtained for five cents each, by addressing the "Commissioner of Patents, Washington, D. C."